E. F. W. ALEXANDERSON.
SERIES MULTIPLE CONTROL.
APPLICATION FILED JAN. 29, 1914.

1,300,542. Patented Apr. 15, 1919.
4 SHEETS—SHEET 1.

Fig. 1.

WITNESSES:
Anthony Marx.
J. Ellis Glen.

INVENTOR:
ERNST F. W. ALEXANDERSON,
BY
HIS ATTORNEY.

Witnesses:

Inventor:
Ernst F. W. Alexanderson,
by His Attorney.

UNITED STATES PATENT OFFICE.

ERNST F. W. ALEXANDERSON, OF SCHENECTADY, NEW YORK, ASSIGNOR TO GENERAL ELECTRIC COMPANY, A CORPORATION OF NEW YORK.

SERIES-MULTIPLE CONTROL.

1,300,542. Specification of Letters Patent. Patented Apr. 15, 1919.

Application filed January 29, 1914. Serial No. 815,280.

*To all whom it may concern:*

Be it known that I, ERNST F. W. ALEXANDERSON, a citizen of the United States, residing at Schenectady, county of Schenectady, State of New York, have invented certain new and useful Improvements in Series-Multiple Controls, of which the following is a specification.

My invention relates to the operation of polyphase motors from a single phase source of supply by the use of a phase converter, and more especially to a method of control whereby an advantageous operation of such an arrangement is secured.

The operation of polyphase motors from a single phase source of supply in conjunction with a phase converter is well known and various schemes of connecting these elements have been proposed in order to attain particular advantages. It is well known that an ordinary induction motor having a squirrel cage or phase wound rotor may be employed as the phase converter in such a system. Two systems of connection for the converter are illustrated in my previous Patents, #901,513 and #1,150,652 respectively. In the former is illustrated a parallel arrangement which is characterized by the fact that one phase of the converter and one phase of the motor are each connected directly to the single phase source and in the latter is illustrated a series arrangement which is characterized by the fact that one converter phase is serially connected between the single phase source and one motor phase while in both arrangements the other converter phase or phases are connected in series with the other phase or phases respectively of the motor.

In the parallel arrangement in order to maintain a substantial balance between the polyphase motor currents at the different loads it is necessary to alter the internal connections of the converter phases or the voltages impressed thereon. On the other hand the series arrangement has an inherent tendency to maintain a balance between the polyphase currents with varying loads and by interpolating a voltage of the proper value in the circuit or circuits in which the last named converter phase or phases and motor phase or phases are serially connected, the value relation between the polyphase currents and the phase relation therebetween approach more nearly to that desired.

In the systems described the magnetization of the converter is effected by means of the stator windings but I have discovered that if the rotor of the converter be provided with a suitable winding which is excited from a direct current source, it becomes possible to wholly eliminate the magnetizing current in the stator windings by a proper adjustment of the direct current excitation. This synchronous excitation by means of the direct current winding is attended by very desirable, though somewhat different, results in the parallel and series arrangements of connections. In the parallel arrangement the main advantage is that by increasing the excitation the power factor of the converter may be increased to any desired degree. In the series arrangement by the adjustment of the excitation to a certain value the desired balance of polyphase currents and the theoretically correct phase relation of polyphase currents are automatically and accurately maintained with varying loads, and furthermore the power factor of the converter, and of the system, is improved.

Since the series arrangement of connections is best suited to certain operating conditions and the parallel arrangement of connections is best suited to certain other operating conditions, my invention has for one of its objects to provide a system and method of control therefor whereby a series arrangement or parallel arrangement of connections may be effected at will according to operating conditions and also whereby the advantages attendant upon the employment of synchronous excitation, which is independent of the stator windings of the converter, may be secured in the fullest measure.

My invention has for another object the method of operating a combined system of the kind indicated whereby the series arrangement of connections is effected when the motor load is variable so that balanced polyphase currents and the theoretically correct phase relation of polyphase currents are automatically maintained for all motor loads and the parallel arrangement of connections is effected when the motor load has an approximately constant and predetermined value, and whereby with the parallel arrangement of connections the power factor of the converter is varied to the desired extent. A further object of my invention is the provision of means whereby the foregoing method of operation may be readily accomplished.

My invention has for another object the provision of means, and the method, of control whereby a polyphase motor, in a system of the kind indicated, may be effectively and satisfactorily accelerated.

For these purposes, I provide a phase converter of the induction type having an exciting field winding on the secondary member and an exciter, with its rotor mechanically connected to the rotor of the phase converter. Between the single phase source of supply and my system, I interpose a transformer with a divided secondary conveniently provided with taps. For making the necessary connections and changes I use a master controller of the drum type arranged to energize contactors which close and open the circuits. Any form of polyphase motors may be used, but preferably they will be of the induction type.

My invention will be more readily understood from the following description when taken in connection with the accompanying drawings, in which.

Figure 1:
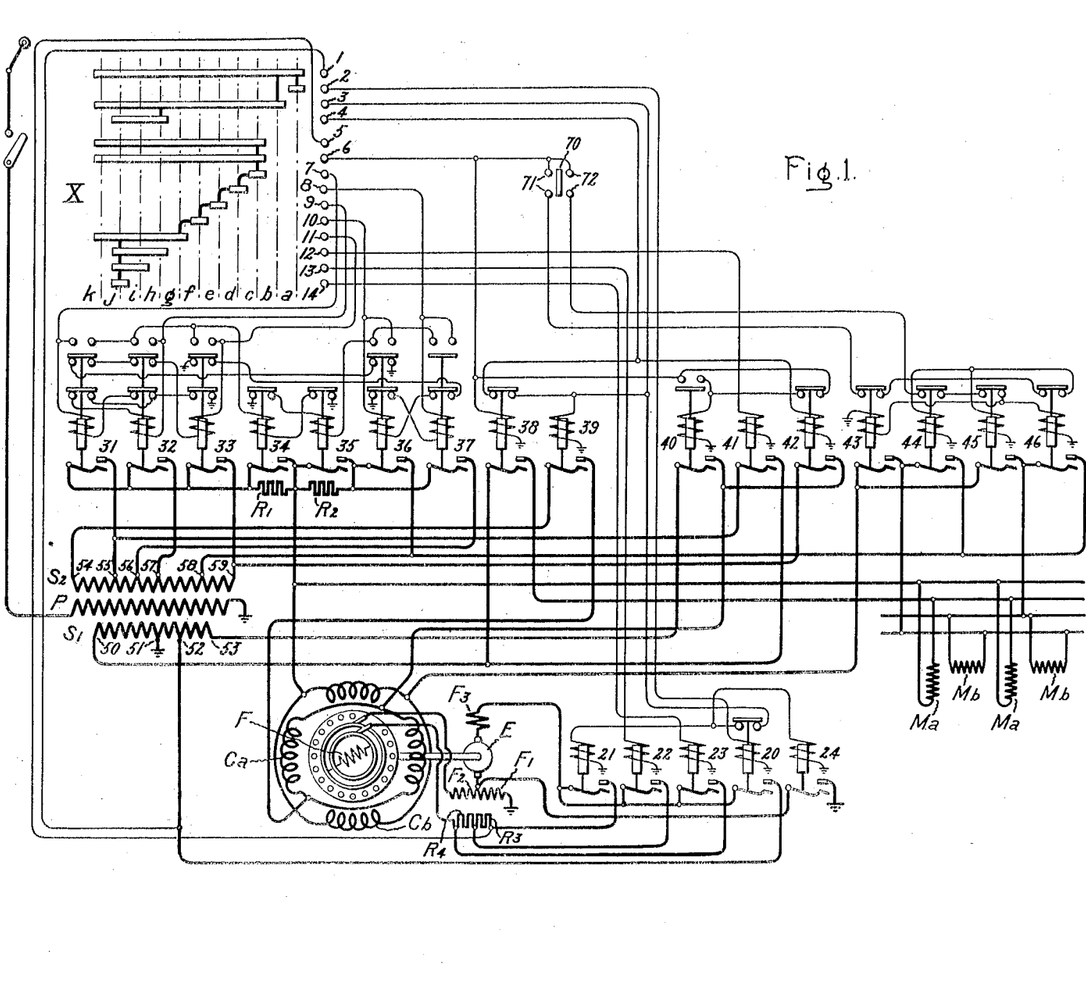
Figure 1 is a diagram showing the controller connections for obtaining the desired operation.

Considering the arrangement shown in Fig. 1 and the diagrams shown in Figs. 3 to 8, inclusive, it will be seen that, in general, power is supplied, as from a trolley, to the primary P of a transformer and thence to the return conductor, here indicated as a ground connection. In inductive relation with the primary P are two secondary windings $S_1$ and $S_2$. For the purposes of illustration, I have indicated the motors as two-phase motors, and have designated their windings as $M_a$ and $M_b$. For changing the single phase current obtained from the supply to two-phase current, I have indicated diagrammatically a phase converter having two windings in quadrature, which I will designate as $C_a$ and $C_b$. This converter will ordinarily be of the induction motor type, and I have, therefore, shown it as provided with a squirrel cage armature. Arranged upon the rotor with the squirrel cage winding, is a field winding F connected between slip rings. A single phase alternating current commutator machine E is mechanically connected to the rotating element of the converter. This machine is provided with two field windings $F_1$ and $F_2$ wound in opposition and with a commutating field winding $F_3$. For the purpose of effecting the various connections, switches 20 to 24 inclusive, and 31 to 46 inclusive, are used. These switches are preferably electromagnetically operated, although it will be understood that any equivalent type of switch may be substituted. As here shown diagrammatically, these switches comprise a movable core suitably connected to the main switch lever and provided with any desired interlocking switches. A solenoid surrounds the movable core and, when energized, causes the closing of the main switch. By means of the interlocking switches, it is possible to "lock" or prevent the operation of another switch prior to the opening or closing of some specified switch.

To suitably control the energization and operation of these electromagnetic switches, I have provided a master controller X which may be of any desired type. The incoming circuits are connected to fixed contact points 1 to 14. Coöperating with these fixed points is a movable element, shown in development, which carries contact segments indicated by solid line rectangles. These segments are suitable interconnected to effect the desired connection between the contact points, and the relative positions of points and segments at the various steps are indicated by the dot-and-dash lines $a$ to $k$ inclusive.

The secondary $S_1$ is provided with intermediate terminals or taps 51 and 52 and the usual end terminals 50 and 53. Leading from the stud 1 of the master controller is a connection to tap 52 of the secondary, while tap 51 is connected to ground, thereby providing a low voltage A. C. supply for operating certain switches. As will be self-evident, all those points which I have shown on the diagram as connected to ground might as well be connected to a common metallic conductor if such an arrangement is found desirable, but I have used this particular manner of illustration in order to simplify the diagram.

When the controller is turned to position $a$, the switch 20 is energized and alternating current furnished from the taps 51 and 52 of the secondary $S_1$ to the commutator machine E. This machine E, which I shall hereinafter term an exciter, will then operate as a series motor excited by the field winding $F_1$ and rotate the converter, bringing it up to about two-thirds of its normal speed. Through a suitable interlock on the switch 20, the switches 21 and 24 may not be closed until the switch 20 has opened.

Moving the controller to step $b$ will energize the switches 21 and 24, connect the exciter E to field winding F of the converter, and short-circuit the field winding $F_1$. In this connection the field winding $F_2$ will furnish the necessary excitation and the circuit will include the resistances $R_3$ and $R_4$. By providing a short circuit around the field winding $F_1$, I make the exciter voltage less sensitive to fluctuations in current, or, in other words, give the exciter the characteristics of a shunt generator. Any condition of shunting which may exist will, if the exciter is a series generator, induce pulsating currents in the exciter field winding, and these pulsations of current will result in corresponding pulsations of voltage. These, in their turn, would increase the original pulsation and might make the operation of the whole apparatus unstable. Such a short circuit as I have provided will, then, prevent any appreciable pulsations of the field flux and will increase the facility with which the phase converter will be brought into step after an interruption of power. At this step switches 39 and 42 will also be energized and converter phase A will be thereby connected to the end terminals 54 and 59 of $S_2$. An interlock provided upon switch 42 prevents the closing of switch 40, and the current for switch 39 is supplied through an interlock on switch 38. By the energization of one phase of the converter, I cause this machine to run as a single phase induction motor, at the same time driving the machine E as an exciter.

It should be noted that the exciter is not wholly dependent upon its own residual magnetism for building up its field, but that the induced current in the secondary circuit of the converter, which pulsates slowly with the frequency of the slip, will assist in building up the field. After the exciter field has been thus built up, it will furnish sufficient current as a generator to the winding F of the converter to draw the same into synchronous speed, which latter will be maintained as long as the machines so run.

Fixed point 5 on the master controller is suitably connected to the exciter circuit so that a supply of direct current is obtained through the short circuit around field winding $F_1$ and the switch 24 which will energize the remaining switches as may be desired.

On turning the controller to step $c$, switches 21, 24, and 39 will remain closed, as, in fact, they do throughout all of the remaining steps. Switch 38 will then be energized and through its interlock cause a dropping out of switch 42. At the same time switch 40 will be closed and when closed will short circuit the interlock on switch 42.

Interposed in one of the circuits leading from fixed point 6 in the controller is a reversing switch 70 which may close either circuit 71 or 72. In case circuit 71 is closed, switches 44 and 45 will be energized and will lock 43 and 46. In case circuit 72 be closed, switches 43 and 46 will be energized and will lock 44 and 45. The effect of the closing of one or the other of these circuits will be to reverse the relative connections of motor phase B, and for the purpose of the remaining description I shall consider that switch 70 is in proper position to close circuit 71.

In this position of the controller, (step $c$) switch 31 is energized, locking switches 32 and 33 and energizing switch 34. The closing of switch 31 effects a circuit from tap 55 on the secondary $S_2$ through the resistance $R_1$ to the permanent connection between motor phase A and converter phase B. The subsequent closing of switch 34 short circuits this resistance and at the same time locks switch 35. It should be here noted that the secondary $S_2$ is provided with the usual end terminals 54 and 59 and with other intermediate terminals or taps 55, 56, 57 and 58. At this position $c$ of the controller, it will be seen that switches 21, 38, 39, 40, 44 and 45 are energized and they remain energized throughout the remaining steps. These, together with the closing of switches 31 and 34, effect the connections illustrated diagrammatically in Fig. 3. The corresponding phases of motor and converter are connected in series, and the voltage impressed on motor phase A and converter phase A is equal to that induced in secondary $S_1$ plus that induced between taps 54 and 55 of $S_2$, while upon motor phase B and converter phase B, connected in series, an interpolated voltage equal to that induced between taps 55 and 58 of $S_2$ is impressed.

Figures 3, 4, 5, 6:
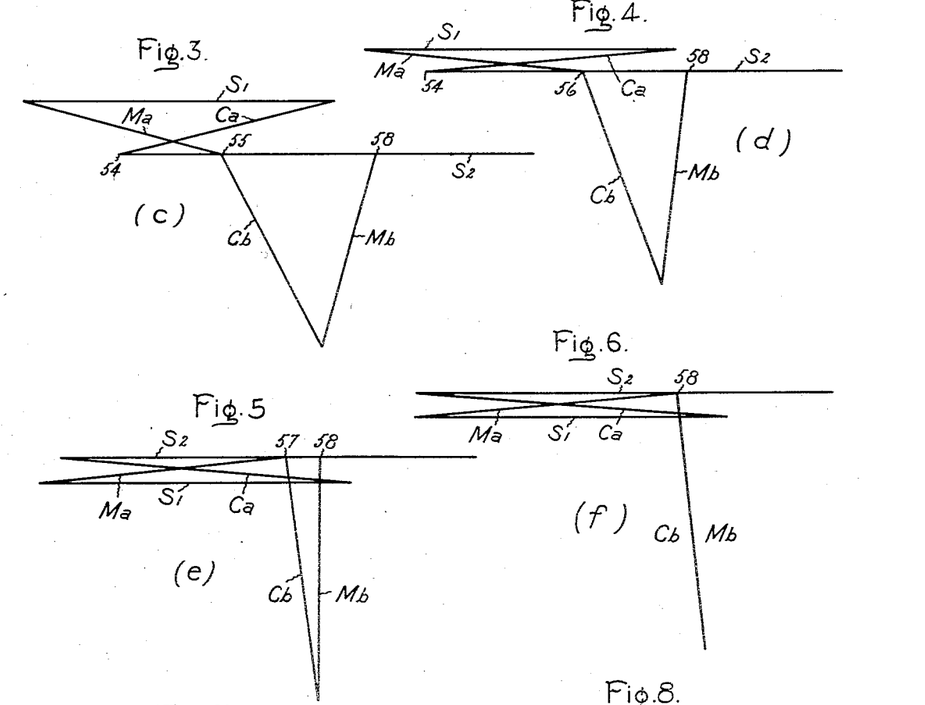
Figs. 3 to 8, inclusive, are vector diagrams showing the phase relations of the various voltages, and at the same time showing diagrammatically the connections between the various windings at various steps of the method of operation shown in Fig. 1.

If the controller be now moved to step $d$, the switches 31 and 34 would be opened and switches 37 and 35 closed, the switch 37 locking switch 36 and closing the circuit for switch 35, whose operation locks switch 34. By the closing of switch 37 the circuit leading from tap 56 upon $S_2$ has been closed through the resistance $R_2$, while the subsequent closing of switch 35 short circuits this resistance. In this position of the controller the resulting connections are illustrated in Fig. 4, in which it will be seen that the joint connection of motor phase A with converter phase B has been moved from tap 55 on $S_2$ to tap 56. The voltage impressed on phase A of motor and converter has been thereby increased, while the interpolated voltage on phase B has been substantially simultaneously decreased.

At step $e$ switches 37 and 35 will open and switches 32 and 34 will close. The closing of switch 32 locks switches 31 and 33 and closes the circuit leading to 34, which in turn locks 35. As in the previous operation, switch 34 merely serves to short circuit the resistance $R_1$, while switch 32 has moved the joint connection of $M_a$ and $C_b$ from the tap 56 to the tap 57 of $S_2$, as shown in Fig. 5, thereby increasing the impressed voltage on the phase A and decreasing the interpolated voltage on the phase B.

If the controller is then moved to step $f$, switches 32 and 34 will be opened, while 36 and 35 will be closed. The closing of switch 36 locks 37 and 33 and closes the circuit for 35, which in turn locks 34 and short circuits the resistance $R_2$. At this step the connections resulting are illustrated in Fig. 6, from which it will be seen that the joint connection of $M_a$ and $C_b$ has been moved to tap 58 of $S_2$, with the result that the voltage impressed on phase A has been increased, while the interpolated voltage on phase B has been reduced to zero. An inspection of Fig. 1 will show, however, that one terminal of $M_b$ is connected to one terminal of $C_b$ through switch 45, while the other terminal of $M_b$ is connected by means of switches 44, 36 and 35 to the other terminal of $C_b$, thereby keeping these phases in series. Since, however, there is no interpolated voltage, the voltage of the two will be in phase and in quadrature to the voltage in $M_a$.

Figures 7, 8:
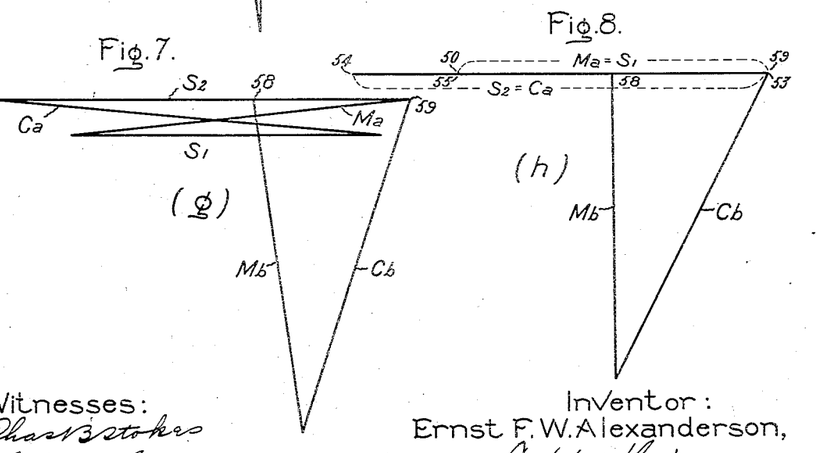

At step $g$ switches 36 and 35 are opened, while 33 and 34 are closed. The closing of 33 locks 32 and 36 and energizes 34, which locks 35 and short circuits $R_1$. At this position the resulting connections are illustrated in Fig. 7 from which it will be seen that the joint connection of $M_a$ and $C_b$ has been moved to the end terminal 59 of $S_2$. Since $M_b$ remains connected to tap 58 of $S_2$, the phase of the voltage interpolated in phase B has been reversed from that obtained in steps $c$, $d$ and $e$. At the same time the impressed voltage on phase A has been increased and an interpolated voltage again inserted in phase B.

If the controller be now moved to step $h$, the same switches which were closed in step $g$ will remain closed, and in addition switches 41 and 42 will be closed. By means of switch 41 a connection is established between tap 50 on $S_1$ and tap 55 on $S_2$, while by means of switch 42 a connection is established between tap 53 on $S_1$ and 59 on $S_2$; the result will be to give the connections indicated diagrammatically in Fig. 8. Since the diagram not only represents the connections, but also voltage relations in various windings, the parallel connection which has been established brings the voltages in phase A of motor and converter and in secondaries $S_1$ and $S_2$ in phase. It will be understood, however, that motor phase A receives a voltage equivalent to that induced in $S_1$, while converter phase A receives a voltage equivalent to that induced in $S_2$. On motor phase B an interpolated voltage equal to that induced between taps 58 and 59 of $S_2$ is inserted. It will be noted that the voltages impressed from the transformer windings $S_1$, and $S_2$, upon the windings $M_a$ and $C_a$, connected in parallel, have been so chosen that the voltages impressed on the motor phases $M_a$ and $M_b$ are balanced and, consequently, the currents therein are balanced.

If the controller be now moved to step $i$, switch 22 will be energized, which will short circuit resistance $R_3$ in the exciter circuit; otherwise, the connections will remain as at step $h$. This short-circuiting of the resistance $R_3$ will cause an increase of the excitation impressed in field F and thereby an increase in the wattless current generated by the converter and supplied to the motor. At this step it should be noted that the relation between corresponding phases of motor and converter is similar to that between the motor and generator; therefore, by increasing the excitation of the converter a similar effect is obtained as by over-exciting the generator, and a leading current is generated in the converter which is introduced directly into the corresponding motor phase. The effect, therefore, is to improve the power factor of the motor, and thence of the line, and to reduce the voltage drop.

Moving the controller to step $j$ will maintain the connection established at step $i$, but will also energize switch 23 and thereby short circuit the resistance $R_4$. This will cause a further increase of the excitation of the converter and a cumulative effect such as that just now described.

As was described in the early part of the specification, the parallel connection of motor and converter is not altogther desirable for the running position, however desirable it may be during acceleration. I have therefore, provided an additional step $k$ on the controller which restores the connections to those established at step $g$, illustrated in Fig. 7, as the last step in the series connection. I find that this is most desirable for running, since with variable loads an automatic balance is obtained.

Figure 2:
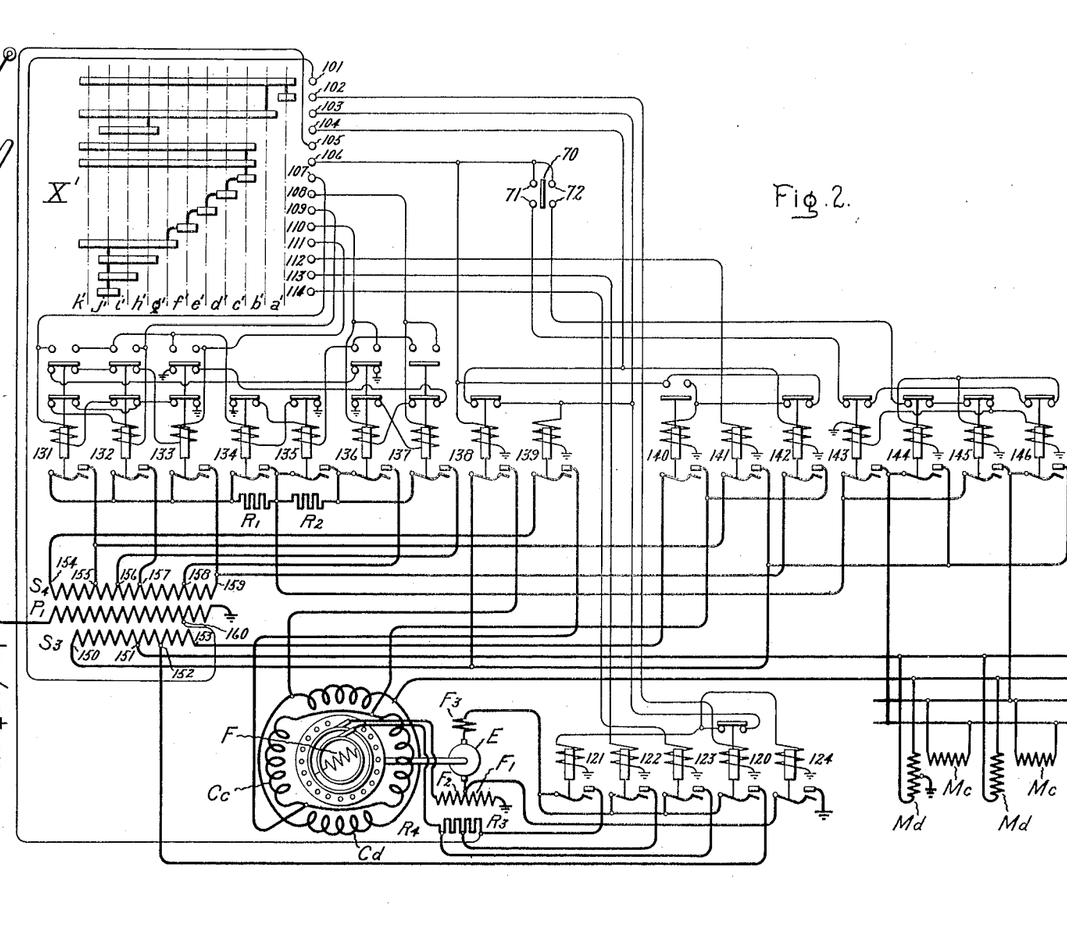
Fig. 2 is a similar diagram wherein the operation is slightly different.

In Fig. 2 I have illustrated the connections for carrying out a slightly different operation from that described in connection with Figs. 1 and 3 to 8, inclusive. In this case the interpolated voltage on one phase is kept constant, while the impressed voltage on the other phase is varied and the connection changed from series to parallel in a similar manner as previously. Referring to Fig. 2 it will be seen that I have designated the primary of the transformer as $P_1$ and have located thereon tap 160, from which the supply of alternating current for operating certain of the switches is obtained. The two secondaries $S_3$ and $S_4$ correspond in construction to $S_1$ and $S_2$, and the taps 150 to 159, inclusive, correspond to the taps 50 to 59, inclusive, in Fig. 1. I have designated the two phases of the converter as $C_c$ and $C_d$, while the corresponding motor phases are lettered $M_c$ and $M_d$. In this instance a ground is provided on the middle point of $M_d$. The fixed points of the master controller $X'$, 101 to 114, inclusive, correspond exactly with those of the master controller $X$, while the development of the controller is exactly similar and its various steps are designated at $a'$ to $k'$, inclusive. The switches 120 to 124 and 131 to 146 are constructed in exactly a similar manner as 20 to 24 and 31 to 46 in Fig. 1, and the connections between the controller and the switches remain the same, as does the location of the reversing switch 70. Since the movement of the controller will result in the energization of similar switches as in Fig. 1, and the interlocks remain the same, it will be necessary for a description of this figure merely to refer to the actual connections produced, without reciting in detail the means for producing them.

When the controller is moved a step $a'$, alternating current is supplied to the exciter E to drive the same as a motor. Since the secondary $S_3$ is not provided with a ground, the current flows through the ground on $M_d$ and thence to the tap 151 on $S_3$.

At step $b'$ one phase $C_c$ of the converter will be connected across the secondary $S_4$ to start the same as an induction motor driving the machine E as a generator.

Figures 9, 10, 11, 12, 13, 14:
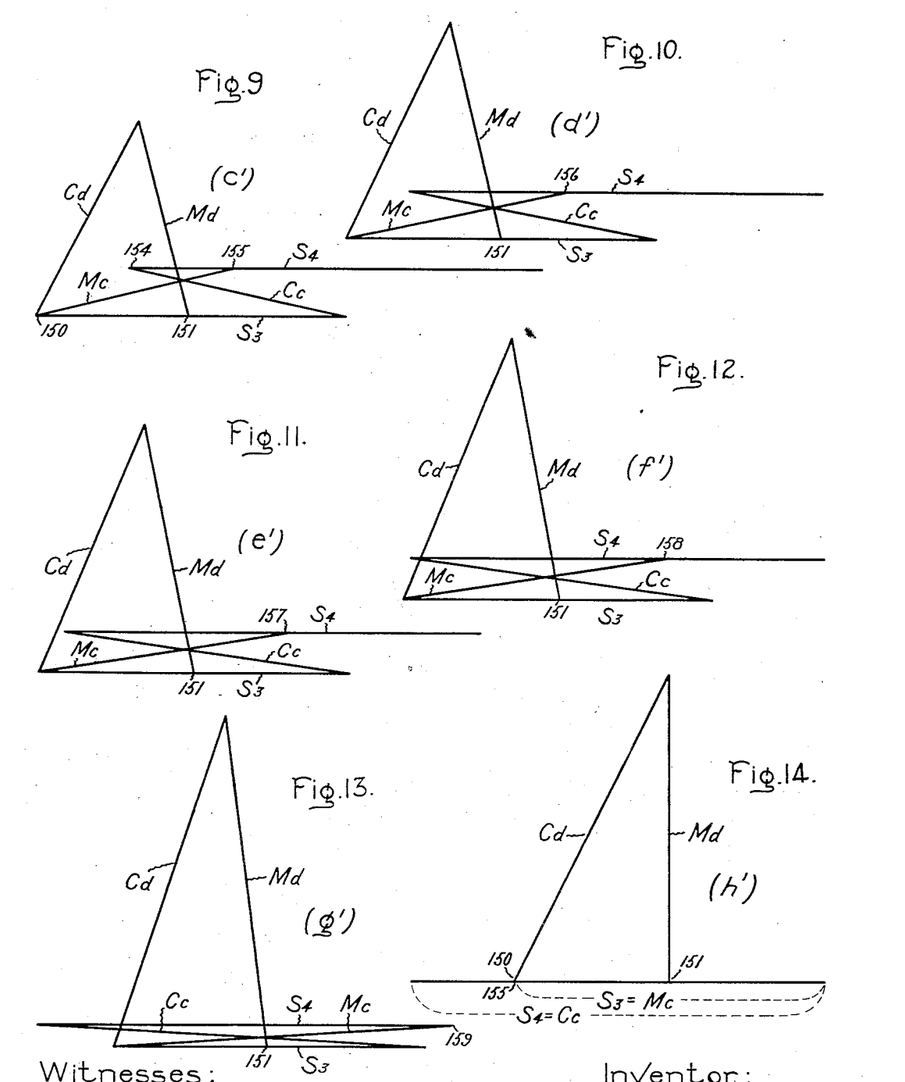
Figs. 9 to 14, inclusive, are similar diagrams showing the voltage relations and actual connections obtained at various steps of the operation of the arrangement shown in Fig. 2.

At step $c'$ the connections indicated in Fig. 9 will result, from which it will be seen that a voltage equal to that induced between taps 150 and 151 on $S_3$ is impressed on phase D of motor and converter, while on phase C there is impressed a voltage equal to that induced in $S_3$ plus that induced between taps 154 and 155 on $S_4$.

At step $d'$ the only change is in moving the terminal of $M_c$ to tap 156 on $S_4$ thereby increasing the impressed voltage on phase C. Here, as in all of the other steps, the interpolated voltage on phase D remains the same. At step $e'$ $M_c$ is moved to tap 157 on $S_4$, while at step $f'$ it is moved to tap 158. At step $g'$, the last of the series connection, $M_c$ is moved to tap 159 on $S_4$, whereby the total voltage of the transformer secondary is impressed on phase C.

The next step $h'$ changes to the parallel connection in a similar manner as in the previous arrangement, and the voltage impressed on $M_c$ is equal to that induced in $S_3$, while that impressed on $C_c$ is equal to that induced in $S^4$.

At steps $i'$ and $j'$ the excitation of the converter field F is increased by short-circuiting the resistances $R_3$ and $R_4$, while step $k'$ the connections are changed back to those illustrated in Fig. 13, in order to obtain a suitable running condition.

It should be noted that in all the vector diagrams shown in Figs. 3 to 14, inclusive, the lengths of vectors represent the relative values of the voltages on the various windings, while their angular relations represent the phase relations of these voltages. At the same time, these diagrams represent the actual connections between the various windings obtained at the several steps in my control. Whether the particular operation used is that indicated in Figs. 3 to 8, or in Figs. 9 to 14, it will be seen that I have outlined a method of control for polyphase motors energized from a single phase source of supply with the use of a phase converter. By the particular arrangement employed I am enabled to get a balanced condition of motor voltages, as will be seen from an inspection of the various diagrams, in which the motor voltages are always substantially in quadrature and of substantially equal magnitude. Furthermore, I have shown two examples of a method of control whereby the advantages resulting from both series and parallel connections of converter and motor have been utilized to advantage. In accelerating the series connection is first used and the impressed voltage on phase A or phase C gradually increased in order to obtain an increase in torque. At the same time, the interpolated voltage is either varied according to the method used in Figs. 3 to 8, or is allowed to remain constant, as in Figs. 9 to 14. Although the employment of an interpolated voltage and the variation thereof is not essential to the acceleration of the motor, nevertheless its use, in the modification shown in Fig. 1, enables the voltage in phase B to be adjusted simultaneously with that in phase A and this is accomplished, with the connections corresponding to Figs. 3 to 6 inclusive, by inserting the interpolated voltage in phase B in opposition to that generated in said phase. A reduction in said interpolated voltage therefore results in an increase in the effective voltage in the phase. With the connections corresponding to Fig. 7, the interpolated voltage assists the voltage generated in phase B and hence the effective voltage in phase B is increased.

The employment of a winding, associated with the single phase source of energy, for the purpose of interpolating a voltage in phase B of the modification of Fig. 1 and phase D of the modification of Fig. 2 also facilitates the response of the conditions in the single phase mains to the conditions in the converter phases. After the maximum torque of which the series connection is capable has been obtained, a transfer is made to the parallel connection and the excitation of the converter then increased in order to simultaneously increase the torque while obtaining the desired correction of power factor in the motor. After the motor has been fully accelerated, the motor and converter are again connected in series in order to obtain the inherent balance and flexibility which is characteristic of this connection.

I conceive that various modifications of the particular arrangements herein outlined might readily be made, and I therefore do not desire to be limited to the exact arrangement shown and described, but seek to cover in the appended claims all those modifications which fall within the scope and spirit of my invention. The particular system and method of operation which I have herein described are particularly applicable to induction motors provided with squirrel cage windings. With motors of another type it might be found desirable to use another sequence of operation or to omit certain steps which are used in the particular system illustrated. The essential characteristic of my invention is that I secure the advantages which result from the use of both the parallel and the series connection of phase converter and polyphase load. The particular arrangement of the exciter so that the same may be used both as a starting motor and as an exciter, and the method of utilizing the same in connection with the phase converter have not been herein claimed, because these features are claimed in my co-pending application Serial No. 113,483, filed August 7, 1916.

Although the relatively movable elements of the converter have been referred to in several instances as stator and rotor it is of course understood that either element may constitute the stationary or rotatable element.

Certain portions of the subject matter, illustrated and described in this application, are described and claimed in my copending applications, Serial No. 150,412, filed February 23, 1917, and Serial No. 150,413, filed February 23, 1917. In the former application is described and claimed a system involving a phase converter or balancer of the induction motor type comprising relatively rotatable members, one of which is provided with a squirrel cage winding and means for synchronously exciting the converter and the other of which is provided with windings connected to the load circuit and the supply circuit according to the series arrangement hereinbefore described, and in the latter application is described and claimed a system involving a phase converter or balancer of the induction motor type comprising relatively rotatable members, one of which is provided with a squirrel cage winding and means for synchronously exciting the converter, and the other of which is provided with windings connected to the load circuit and the supply circuit according to the parallel arrangement of connections hereinbefore described.

What I claim as new and desire to secure by Letters Patent of the United States, is,—

1. The method of operating a system of phase conversion, in which a polyphase load circuit derives its energy from a single phase source by means of a phase converter, which consists in having one load phase connected in series with one converter phase to said source when the polyphase load is variable and in having said load phase and said converter phase independently connected to said source when the polyphase load approximates a predetermined value.

2. The method of operating a system of phase conversion, in which a polyphase load circuit derives its energy from a single phase source by means of a phase converter, which consists in maintaining one load phase connected in circuit with one converter phase, and in having another load phase connected in series with another converter phase to said source when the polyphase load is variable and in having the second named load phase and the second named converter phase independently connected to said source when the polyphase load approximates a predetermined value.

3. The method of starting a polyphase motor from a single phase source by means of a phase converter which consists in connecting one motor phase and one converter phase in series with each other to said single phase source and maintaining such connection while the motor torque is changing and then connecting said motor phase and said converter phase independently of each other to said single phase source.

4. The method of operating a system comprising a polyphase motor, a single phase source of energy, and a phase converter of the polyphase motor type adapted to be synchronously excited independently of said source, which consists in maintaining one motor phase connected in circuit with one converter phase, and in having another motor phase connected, in series with another converter phase, to said source and maintaining the converter excitation substantially constant when the load on said motor is variable and in having the second named motor phase and the second named converter phase independently connected to said source and either maintaining or increasing the converter excitation, when the motor load approximates a predetermined value.

5. The method of controlling a polyphase motor deriving energy from a single phase line through a phase converter, of which one phase is connected to one phase of the motor, and another phase is connected in series with another phase of the motor, which consists in interpolating into said first-named circuit a voltage different in value from that of said source, impressing a voltage derived from said source on said series circuit, and increasing the latter voltage.

6. The method of controlling a polyphase motor deriving energy from a single phase line through a phase converter, of which one phase is connected to one phase of the motor, and another phase is connected in series with another phase of the motor, which consists in interpolating into said first-named circuit a voltage different in value from that of said source, impressing a voltage derived from said source on said series circuit, increasing the latter voltage, and substantially simultaneously decreasing the interpolated voltage.

7. The method of controlling a polyphase motor deriving energy from a single phase line through a phase converter, of which one phase is connected to one phase of the motor, and another phase is connected in series with another phase of the motor, which consists in interpolating into said first-mentioned phase circuit a voltage different in value from that of said source, impressing a voltage derived from said source on said series circuit, increasing the latter voltage, substantially simultaneously decreasing the interpolated voltage until it becomes zero, and then interpolating a voltage of reversed phase.

8. The method of controlling a polyphase motor deriving energy from a single phase line through a phase converter, of which one phase is connected to one phase of the motor, and another phase is connected in series with another phase of the motor, which consists in interpolating into said first-mentioned phase circuit a voltage different in value from that of said source, impressing a voltage derived from said source on said series circuit, increasing the latter voltage, substantially simultaneously decreasing the interpolated voltage until it becomes zero, then interpolating a voltage of reversed phase, and then connecting in parallel the last mentioned phases of the motor and converter.

9. The method of controlling a polyphase motor deriving energy from a single phase line through a phase converter, of which one phase is connected to one phase of the motor, and another phase is connected in series with another phase of the motor, which consists in interpolating into said first-mentioned circuit a voltage different in value from that of said source, impressing a voltage derived from said source on said series connected phases, and then connecting these phases in parallel to the source.

10. The method of controlling a polyphase motor deriving energy from a single phase line through a phase converter, of which one phase is connected to one phase of the motor, and another phase is connected in series with another phase of the motor, which consists in interpolating in said first-mentioned circuit a voltage different in value from that of said source, impressing a voltage derived from said source on said series connected phases, then connecting these phases in parallel to the source, and subsequently removing said parallel connection and again connecting these phases in series.

11. The method of controlling a polyphase motor deriving energy from a single phase line through a phase converter, of which one phase is connected to one phase of the motor, and another phase is connected in series with another phase of the motor, which consists in interpolating in said first-mentioned circuit a voltage different in value from that of said source, impressing a voltage derived from said source on said series connected phases, increasing said impressed voltage, and then connecting these phases in parallel to the source.

12. The method of controlling a polyphase motor deriving energy from a single phase line through a phase converter, of which one phase is connected to one phase of the motor, and another phase is connected in series with another phase of the motor, which consists in interpolating in said first-mentioned circuit a voltage different in value from that of said source, impressing a voltage derived from said source on said series connected phases, increasing said impressed voltage, then connecting these phases in parallel to the source, and subsequently removing said parallel connection and again connecting these phases in series.

13. The method of controlling a polyphase motor deriving energy from a single phase transformer having an unequally divided secondary winding through a phase converter, of which one phase is connected in series with one phase of the motor, which consists in connecting equal sections of said secondary winding in parallel, connecting a phase of said motor across said smaller section of secondary winding, connecting a phase of said converter across the larger section of said secondary winding, and interpolating in said series circuit a voltage different from that induced in either section of said secondary.

14. The method of controlling a polyphase motor deriving energy from a single phase line through a phase converter having a separately excited field winding, where one phase of the converter is connected to one phase of the motor, and another phase is connected in series with another phase of the motor, which consists in interpolating in said first-mentioned circuit a voltage different in value from that of said source, impressing a voltage derived from said source on said series connected phases, then connecting these phases in parallel to the source, and then increasing the excitation of said converter field winding.

15. The method of controlling a polyphase motor deriving energy from a single phase line through a phase converter having separately excited field winding, where one phase of the converter is connected to one phase of the motor, and another phase is connected in series with another phase of the motor, which consists in interpolating in said first-mentioned circuit a voltage different in value from that of said source, impressing a voltage derived from said source on said series connected phases, then connecting these phases in parallel to the source, then increasing the excitation of said converter field winding, and subsequently removing said parallel connection and again connecting these phases in series.

16. The method of controlling a polyphase motor deriving energy from a single phase line through a phase converter having a separately excited field winding, where one phase of the converter is connected to one phase of the motor, and another phase is connected in series with another phase of the motor, which consists in interpolating in said first-mentioned circuit a voltage different in value from that of said source, impressing a voltage derived from said source on said series connected phases, increasing said impressed voltage, then connecting these phases in parallel to the source, and then increasing the excitation of said converter field winding.

17. The method of controlling a polyphase motor deriving energy from a single phase line through a phase converter having a separately excited field winding, where one phase of the converter is connected to one phase of the motor, and another phase is connected in series with another phase of the motor, which consists in interpolating in said first-mentioned circuit a voltage different in value from that of said source, impressing a voltage derived from said source on said series connected phases, increasing said impressed voltage, then connecting these phases in parallel to the source, then increasing the excitation of said converter field winding, and subsequently removing said parallel connection and again connecting these phases in series.

18. The method of controlling a polyphase motor deriving energy from a single phase line through a phase converter having a separately excited field winding, where one phase of the converter is connected to one phase of the motor, and another phase is connected in series with another phase of the motor, which consists in interpolating in said first-mentioned circuit a voltage different in value from that of said source, impressing a voltage derived from said source on said series connected phases, decreasing said interpolated voltage and substantially simultaneously increasing said impressed voltage, then connecting these series connected phases in parallel to the source, and then increasing the excitation of said converter field winding.

19. The method of controlling a polyphase motor deriving energy from a single phase line through a phase converter having a separately excited field winding, where one phase of the converter is connected to one phase of the motor, and another phase is connected in series with another phase of the motor, which consists in interpolating in said first-mentioned circuit a voltage different in value from that of said source, impressing a voltage derived from said source on said series connected phases, decreasing said interpolated voltage and substantially simultaneously increasing said impressed voltage, then connecting these series connected phases in parallel to the source, then increasing the excitation of said converter field winding, and subsequently removing said parallel connection and again connecting these phases in series.

20. In combination, a single phase source of supply, a phase converter, a polyphase motor and a controller having its contacts arranged in one operating position of the controller to connect one phase of the motor and one phase of the converter in parallel to the source of supply, and in another operating position to connect one phase of the motor and one phase of the converter in series to the source of supply.

21. In combination, a single phase source of energy, a phase converter of the polyphase motor type, means independent of said source for producing synchronous excitation in said phase converter, a polyphase motor, and means for connecting one motor phase in circuit with one converter phase and for connecting another motor phase and another converter phase either in series with each other to said source or independently of each other to said source.

22. In combination, a single phase source of energy, a phase converter of the polyphase motor type having relatively movable members, one of said members having a plurality of windings, a polyphase motor, means adapted to connect one of said windings in circuit with one motor phase and to connect another of said windings and another motor phase either in series with each other to said source or independently of each other to said source, and means associated with another of said members for synchronously exciting the converter independently of the single phase source.

23. In combination, a single phase source of energy, a phase converter of the polyphase motor type having relatively movable members, one of said members having a plurality of windings, a polyphase motor, means adapted to connect one of said windings in circuit with one motor phase and to connect another of said windings and another motor phase either in series with each other to said source or independently of each other to said source, and means comprising an adjustable source of direct current and a winding carried by another of said members for synchronously exciting the converter.

24. In combination, a single phase source of supply, a phase converter, a transformer interposed between the two, a polyphase motor, and a controller having its contacts arranged in one operating position of the controller to connect one phase of the motor and one phase of the converter in parallel to the source of supply and to connect another phase of the converter and another phase of the motor in circuit with one another and with a portion of the winding of said transformer so as to interpolate a voltage different in value from that of the source, and in another operating position to connect the first-named phases in series to the source.

25. In combination, a single phase source of supply, a synchronously excited phase converter, a polyphase motor, and a controller having its contacts arranged in one operating position of the controller to connect one phase of the converter and one phase of the motor in parallel to the source of supply, and to connect another phase of the converter to supply energy to another phase of the motor, and in another operating position to connect the first-named first-named phases in series to the source.

26. In combination, a single phase source of supply, a phase converter, a transformer interposed between the two, a polyphase motor, and a controller having its contacts arranged in one operating position of the controller to connect a phase of the converter and a phase of the motor in parallel to different points of the transformer winding so that substantially balanced currents are produced in the phases of the motor, and to connect another phase of the converter to deliver energy to another phase of the motor, and in another operating position to connect one phase of the motor and one phase of the converter in series to the source of supply.

27. In combination, a single phase source of supply, a phase converter, a transformer interposed between the two, a polyphase motor, and a controller having its contacts arranged in one operating position of the controller to connect one phase of the motor and one phase of the converter in series to the source of supply and to connect another phase of the motor to another phase of the converter in series with a portion of said transformer winding so as to interpolate a voltage different in value from that of said source, and in another operating position to change the connections to increase the voltage delivered by said transformer to said first-mentioned circuit.

28. In combination, a single phase source of supply, a phase converter, a transformer interposed between the two, a polyphase motor and a controller having its contacts arranged in one operating position of the controller to connect one phase of the motor and one phase of the converter in series to the source of supply, and to connect another phase of the motor to another phase of the converter in series with a portion of said transformer winding, so as to interpolate a voltage different in value from that of said source, and in another operating position to change the connections to increase the voltage delivered by said transformer to said first-mentioned circuit, and to substantially simultaneously decrease the interpolated voltage.

29. In combination, a single phase source of supply, a phase converter, a transformer interposed between the two, a polyphase motor and a controller having its contacts arranged in one operating position of the controller to connect one phase of the motor and one phase of the converter in series to the source of supply, and to connect another phase of the motor to another phase of the converter in series with a portion of said transformer winding so as to interpolate a voltage different in value from that of said source, and in other operating positions to change the connections to increase the voltage delivered by said transformer to said first-mentioned circuit, and to substantially simultaneously decrease the interpolated voltage until it becomes zero, and then in another operating position to change the connections to interpolate a voltage of reversed phase.

30. In combination, a single phase source of supply, a phase converter, a transformer interposed between the two, a polyphase motor and a controller having its contacts arranged in one operating position of the controller to connect one phase of the motor and one phase of the converter in series to the source of supply, and to connect another phase of the motor to another phase of the converter in series with a portion of said transformer winding so as to interpolate a voltage different in value from that of said source, and in other operating positions to change the connections to increase the voltage delivered by said transformer to said first-mentioned circuit, and to substantially simultaneously decrease the interpolated voltage until it becomes zero, and then in another operating position to change the connections to interpolate a voltage of reversed phase, and in still another operating position to connect the series connected phases of the motor and converter in parallel to the source of supply.

31. In combination, a single phase source of supply, a transformer having an unequally divided secondary winding, a phase converter, a polyphase motor, means for connecting one phase of the said motor in series with one phase of said converter to a portion of one of said secondary windings to interpolate a voltage in said series circuit, different from that induced in either section of said secondary winding, means for connecting another phase of said motor across said smaller section of secondary winding, and means for connecting another phase of the said converter across the larger section of said secondary winding.

32. In combination, a single phase source of supply, a synchronously excited phase converter, a polyphase motor and a controller having its contacts arranged in one operating position to connect one phase of the motor and one phase of the converter in series to said source of supply and to connect another phase of said converter to supply energy to another phase of said motor and in another operating position to connect said first mentioned phases in parallel to the source of supply, and in still another operating position to retain said parallel connection and to change the connections to vary the excitation of said converter.

In witness whereof, I have hereunto set my hand this 28th day of January, 1914.

ERNST F. W. ALEXANDERSON.

Witnesses:
BENJAMIN B. HULL,
MARGARET E. WOOLLEY.

---

Corrections in Letters Patent No. 1,300,542.

It is hereby certified that in Letters Patent No. 1,300,542, granted April 15, 1919, upon the application of Ernst F. W. Alexanderson, of Schenectady, New York, for an improvement in "Series-Multiple Controls," errors appear in the printed specification requiring correction as follows: Page 2, line 96, for the word " suitable ', read *suitably;* page 3, line 10, for the word " shunting " read *hunting;* page 5, line 21, for the article " a " read *to;* page 7, line 49, claim 9, for the word " into " read *in;* page 9, line 32, claim 25, strike out the compound word " first-named;" and that the said Letters Patent should be read with these corrections therein that the same may conform to the record of the case in the Patent Office.

Signed and sealed this 20th day of May, A. D., 1919.

[SEAL.]

R. F. WHITEHEAD,

*Acting Commissioner of Patents.*

Cl. 172—274.